Dec. 11, 1934.  H. JUNKERS  1,983,612
MEMBER FOR FRAME WORK
Filed Aug. 25, 1930
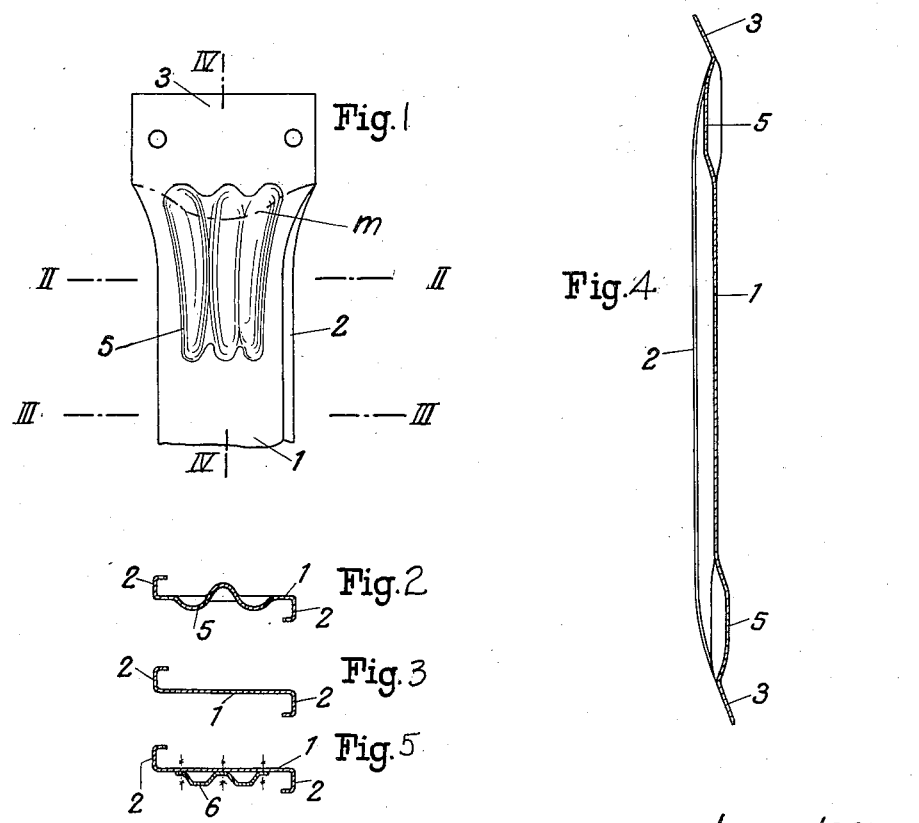
Inventor:
Hugo Junkers
by Karleinhain,
Atty.

Patented Dec. 11, 1934

1,983,612

UNITED STATES PATENT OFFICE 1,983,612

MEMBER FOR FRAME WORK

Hugo Junkers, Dessau, Germany

Application August 25, 1930, Serial No. 477,591
In Germany September 25, 1929

2 Claims. (Cl. 189—34)

My invention relates to members for frame work, and more particularly to members having a braced central portion, flat ends and longitudinal flanges to resist bending.

It is an object of my invention to improve a member of this type with a view to increasing its strength. To this end I brace the central portion of the member near its flat ends.

My invention has particular reference to frame members of section sheet metal, such as are used for frame work or lattice work which are required to withstand bending stresses in all directions. However, I am not limited to this particular case but my members may be applied to other structures without departing from my invention.

Normally, members for frame work or lattice work of the kind described are made of strips of sheet metal placed at right angles to the plane of the frame work or lattice work, with their edges flanged for the major part of the member, and flat end portions for facilitating the connection of the members to the other members of the frame work or lattice work. The end portions are bent at an angle to the plane of the member in such members which make up triangular or rhombic structures.

It has already been suggested to increase the buckling strength of such members by profiling them at their end portions but this is objectionable as it requires insertions which are profiled in conformity with the profiled members at the points where the profiled end portions are superimposed, which obviously increases the cost of such structures.

I have found that an additional bracing action which is substantially equal to the action of the profiled end portions referred to, may be obtained by bracing the central portion of the member near its ends. This may be effected by forming corrugations in, or securing bracing elements to, the flat portion of the central member which bracing means preferably extend in the longitudinal direction of the member as far as, but not beyond the lines where the flat end portions adjoin the central portion of the member, so that the end portions are flat throughout. By these means the manufacturing and assembling are simplified and facilitated, and the cost is reduced, as compared with the partly sectioned end portions referred to.

In the drawing affixed to this specification and forming part thereof, a member embodying my invention is illustrated diagrammatically by way of example.

In the drawing

Fig. 1 is an elevation of the upper end of my novel member,

Figs. 2 and 3 are sections on the corresponding lines in Fig. 1,

Fig. 4 is a section of the complete member, taken on the line IV—IV in Fig. 1, and drawn to a smaller scale, and Fig. 5 is a section corresponding to Fig. 2 but showing modified bracing means.

In calculating the strength of a member under the action of a buckling force, sections are taken at right angles to the member and at given distances, and the moments of inertia are calculated for the several sections. The moment of inertia for a given section, and the distance of the section from the point where the member is secured, serves for determining the buckling force under a given load. The section at the point where the member is secured, undergoes a change from a channel, or any other section, to a rectangular section. As calculated, the sections in the region of the change are sufficient for giving to the member the same, or even a greater, buckling strength as at the central portion, with its flanges. In practice, however, it has been found that the members buckle in this region. The cause is that the buckling region is not bordered by a straight line but by a curve as shown at $m$ in Fig. 1. The ends of this curve are near the line where the member is secured while its central portion is further away from the line.

This remarkable buckling is counteracted by subsidiary bracing means which may be corrugations or other profiled portions 5, as best seen in Fig. 2, or sections 6, Fig. 5, in the region where buckling first occurs. The profiled portions 5 may be corrugated as shown, or may be of any other section. Preferably they are so designed that the major portion of the profiled section projects toward the side of the member to which the adjacent end portion is bent. This is the side on which the flange 2 at the right in Fig. 2 projects from the body of the member. It will appear that two corrugations or creases are at this side, and only one at the opposite side. Instead of providing profiled portions near the ends of the member only as shown, I may provide profiled portions extending throughout the central portion. Obviously the sections 6, Fig. 5, might also extend from one end of the central portion to the other. The sections may be angle sections, any other sections, or strips of sheet metal which may be riveted or otherwise secured to the member.

Buckling on the curve $m$ is prevented by the bracing means described and the strength of the member is increased in proportion.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A member for trellis work comprising a middle web flanged on one side, the width of the flanges being reduced to zero toward the ends of said web, the width of the web portion adjacent the reduced portions of said flanges being correspondingly increased, flat end portions bent at an angle from opposite ends of said web, and corrugations of short extent on the web extending on either end of the strut and substantially in the longitudinal direction of the strut from the bending line between the web and the flat end portions over the adjacent wider web portion, said corrugations serving the purpose of preventing buckling of these wider portions of the web.

2. A strut for trellis work comprising a longitudinally flanged middle web, flat end portions bent at an angle from opposite ends of said web, and corrugations of short extent located on the middle web in its end regions only, said regions being defined by the lines where said flat end portions are bent from the middle web, and said corrugations extending substantially in the longitudinal direction of the middle web, for the purpose only of preventing buckling of the middle web along lines positioned in its end regions.

HUGO JUNKERS.